(12) United States Patent  
Schumacher

(10) Patent No.: US 6,945,388 B2
(45) Date of Patent: Sep. 20, 2005

(54) ANTI-SHINGLING PRODUCT CONVEYING CHAIN

(75) Inventor: Jeffrey A. Schumacher, Port Washington, WI (US)

(73) Assignee: Rexnord Industries, Inc., Milwaukee, WI (US)

( * ) Notice: Subject to any disclaimer, the term of this patent is extended or adjusted under 35 U.S.C. 154(b) by 0 days.

(21) Appl. No.: 10/770,172

(22) Filed: Feb. 2, 2004

(65) Prior Publication Data

US 2005/0167250 A1 Aug. 4, 2005

(51) Int. Cl.⁷ ............................................. B65G 17/06
(52) U.S. Cl. ..................................................... 198/851
(58) Field of Search ................................ 198/851, 853

(56) References Cited

U.S. PATENT DOCUMENTS

| | | | |
|---|---|---|---|
| 1,971,553 A * | 8/1934 | Fisk ........................... 198/851 |
| 2,954,113 A * | 9/1960 | Hibbard et al. ......... 198/867.15 |
| 3,883,284 A * | 5/1975 | De Mets ..................... 425/371 |
| 3,962,977 A * | 6/1976 | Calame et al. ............. 110/329 |
| 3,980,425 A * | 9/1976 | Pinettes et al. ............ 432/239 |
| 4,274,536 A * | 6/1981 | Riegler et al. ............. 198/851 |
| 4,436,200 A | 3/1984 | Hodlewsky |
| 4,542,821 A | 9/1985 | Livermore |
| 4,664,253 A * | 5/1987 | Fahrion ....................... 198/851 |
| 4,893,464 A | 1/1990 | Thuerman |
| 4,893,709 A | 1/1990 | Schroeder et al. |
| 5,042,244 A | 8/1991 | Worsley |
| 5,127,515 A | 7/1992 | Damkjaer |
| 5,137,144 A | 8/1992 | Uehara |
| 5,156,264 A * | 10/1992 | Lapeyre ..................... 198/852 |
| 5,174,436 A | 12/1992 | Wadell |
| 5,307,923 A | 5/1994 | Damkjaer |
| 5,429,226 A | 7/1995 | Ensch et al. |
| 5,909,797 A | 6/1999 | Van Den Goor |
| 5,954,190 A * | 9/1999 | Takahashi et al. .......... 198/853 |
| 6,708,818 B2 * | 3/2004 | Kato et al. .................. 198/853 |

\* cited by examiner

Primary Examiner—Joe Dillon, Jr.
(74) Attorney, Agent, or Firm—Quarles & Brady LLP

(57) ABSTRACT

A product conveying chain includes a top plate fixed to a base chain. The base chain is formed from a series of pairs of inner sidebars pivotally connected to adjacent pairs of outer sidebars. The top plate is fixed to the base chain, and has a trailing edge adjacent a following pair of sidebars. The trailing edge of the top plate includes at least one bump for engaging the following pair sidebars to restrict articulation of the following pair of sidebars relative to the top plate compared to a top plate without the at least one bump. In one embodiment, the top plate includes a leading edge adjacent a preceding pair of sidebars. The leading edge includes at least one notch for receiving the preceding pair of sidebars to allow increased backward flexure of the conveying chain compared to a conveying chain having a top plate without the at least one notch.

9 Claims, 3 Drawing Sheets

ANTI-SHINGLING PRODUCT CONVEYING CHAIN

CROSS REFERENCES TO RELATED APPLICATIONS

Not Applicable

STATEMENT REGARDING FEDERALLY SPONSORED RESEARCH

Not Applicable

TECHNICAL FIELD

The present invention relates to conveying chains, and more particularly to back-flexing product conveying chains having a top plate for carrying objects.

DESCRIPTION OF THE BACKGROUND ART

Product conveying chains typically include a base chain having inner sidebars pivotally linking outer sidebars. A top plate is fixed to the base chain, and provides a surface for conveying a product. These conveying chains must be able to articulate in order to negotiate drive and idler sprockets. Since the base chain joints must be free to articulate, the top plates are typically affixed to each outer sidebar. The inner sidebar is free to articulate relative to the top plate allowing flexure of the assembly. The degree of back flexure is restricted to the point where the leading edge of the top plate contacts the edges of the adjacent inner sidebars of the base chain.

Typically, these top plates have a geometry such that the trailing edge of one top plate overlaps slightly the leading edge of the next. This geometry provides a smooth, semi-continuous surface that prevents the items being conveyed from catching on exposed edges of the top plates. Unfortunately, it is possible for the conveying chain to articulate in such a way that improperly positions the leading edge of the second top plate above the trailing edge of the preceding top plate to cause a condition called shingling. Shingling forms an uneven conveying surface, and can damage the top plate or chain. Accordingly, a need exists for a chain that reduces the occurrence of shingling.

SUMMARY OF THE INVENTION

The present invention provides a product conveying chain that inhibits shingling, and includes a top plate fixed to a base chain. The base chain is formed from a series of pairs of inner sidebars pivotally connected to adjacent pairs of outer sidebars. The top plate is fixed to the base chain, and has a trailing edge adjacent a following pair of sidebars. The trailing edge of the top plate includes at least one bump for engaging the following pair of sidebars to restrict articulation of the following pair of sidebars relative to the top plate compared to a top plate without the at least one bump. In one embodiment, the top plate includes a leading edge adjacent a preceding pair of sidebars. The leading edge includes at least one notch for receiving the preceding pair of sidebars to allow increased backward flexure of the conveying chain compared to a conveying chain having a top plate without the at least one notch.

A general objective of the present invention is to provide a conveying chain that is not susceptible to shingling. This objective is accomplished by providing bumps proximal the trailing edge of the top plate to restrict articulation of the following pair of sidebars relative to the top plate to inhibit shingling.

Another objective of the present invention is to provide an anti-shingling conveying chain without reducing the degree of backflexing of the conveying chain. This objective is accomplished by providing a top plate with a leading edge having at least one notch for receiving the preceding pair of sidebars to allow increased backward flexure of the conveying chain compared to a chain having a top plate without the at least one notch.

The foregoing and other objectives and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DETAILED DESCRIPTION OF THE PREFERRED EMBODIMENTS

Figure 1:
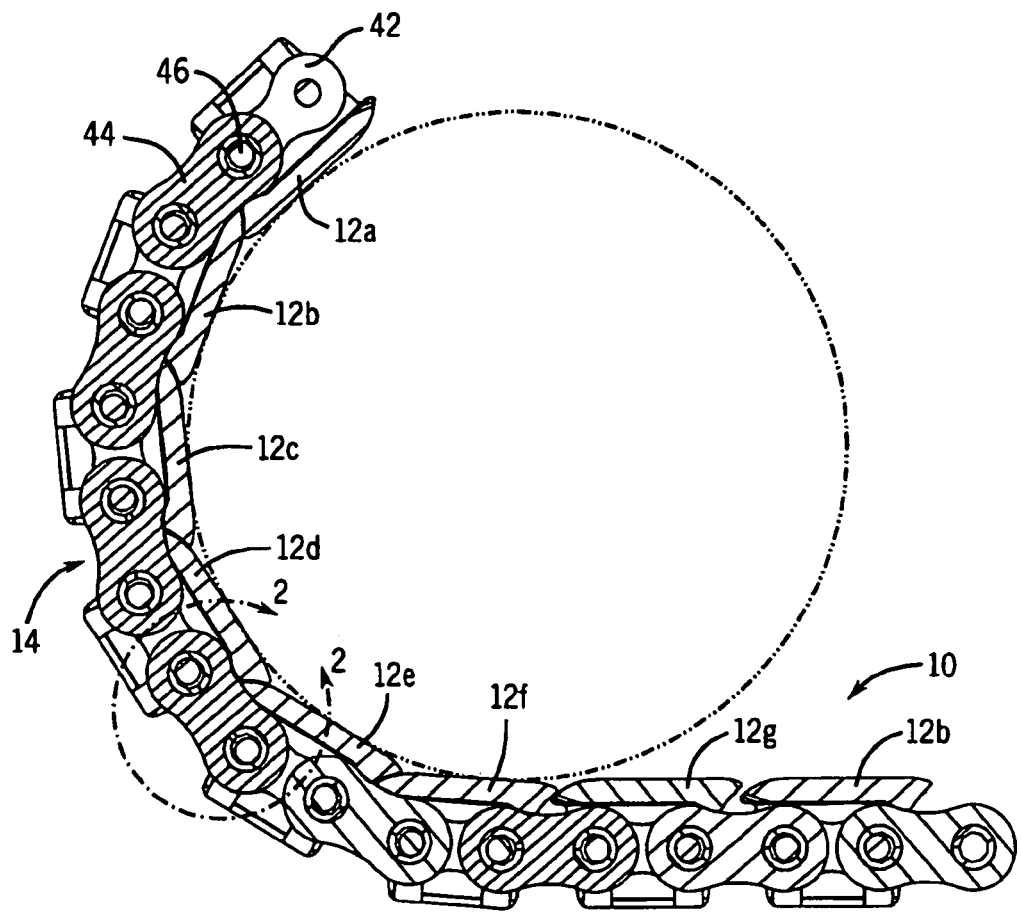
FIG. 1 is a cross sectional view of a backflexing product conveying chain incorporating the present invention.

A product conveying chain 10, shown in FIGS. 1–6, includes a plurality of top plates 12a–h fixed to a base chain 14. The top plates 12a–h include notches 50 formed in their leading edges 18 that allow increased backflexing, and bumps 54 formed proximal their trailing edges 20 restrict articulation of the conveying chain 10 to prevent shingling. The combination of bumps 54 and notches 50 on each top plate 12a–h provides a conveying chain 10 that resists shingling while maintaining an acceptable degree of backflexing.

The base chain 14 includes pairs of outer sidebars 42 and pairs of inner sidebars 44 connected together by a plurality of chain pins 46. The inner sidebars 44 of the base chain 14 between adjacent top plates 12a, 12b join the outer sidebars 42 fixed to the preceding (upstream) top plate 12a and the outer sidebars 42 fixed to the following (downstream) top plate 12b. As a result, the inner sidebars 44 are the following inner sidebars 44 for the upstream top plate 12a and the preceding inner sidebars 44 for the downstream top plate 12b.

The top plates 12a–h are substantially identical, and will be described with reference to adjacent top plates 12a, 12b with the understanding that the description applies to the other top plates 12c–h. Each top plate 12a, 12b is fixed to one of the pairs of outer sidebars 42 of the base chain 14, and has a flat base portion 16 with a leading edge 18 and a trailing edge 20 joined by ends 22. The edges 18, 20 and ends 22 join an upper surface 24 and a lower surface 26 of the base portion 16. The leading edge 18 of the following top plate 12b includes a concave portion 52 that overlaps the trailing edge 20 of the adjacent preceding top plate 12a. The trailing edge 20 of the preceding top plate 12a is tapered and received in the concave portion 52 of the leading edge 18 of the adjacent following top plate 12b. Preferably, the top plates 12a–h are formed from molded plastic. However, the top plates 12a–h can be formed from any suitable material, or combination of materials, such as other plastics, elastomeric materials, metal, ceramic, and the like, without departing from the scope of the invention.

Figure 2:
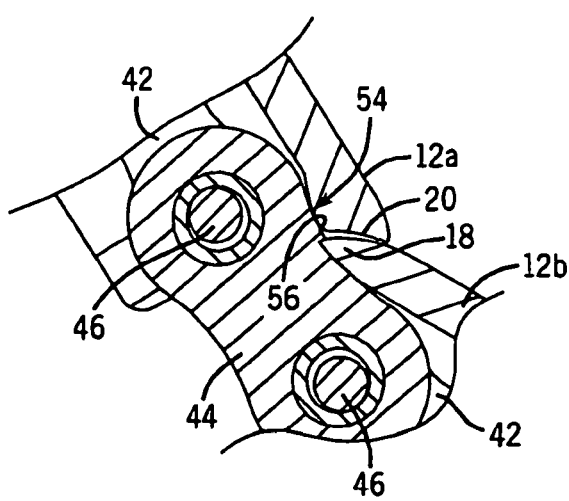
FIG. 2 is a detailed cross sectional view along line 2—2 of FIG. 1.
Figure 3:
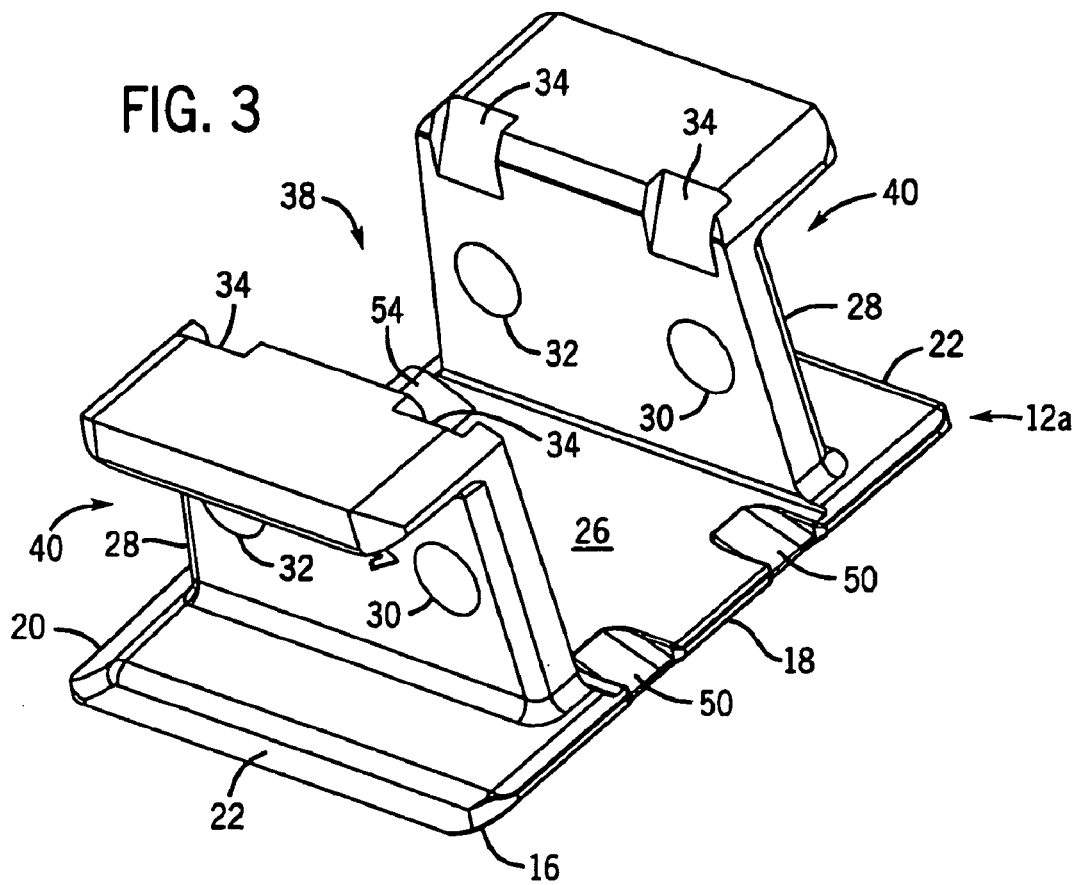
FIG. 3 is a bottom, front perspective view of a top plate of FIG. 1.
Figure 4:
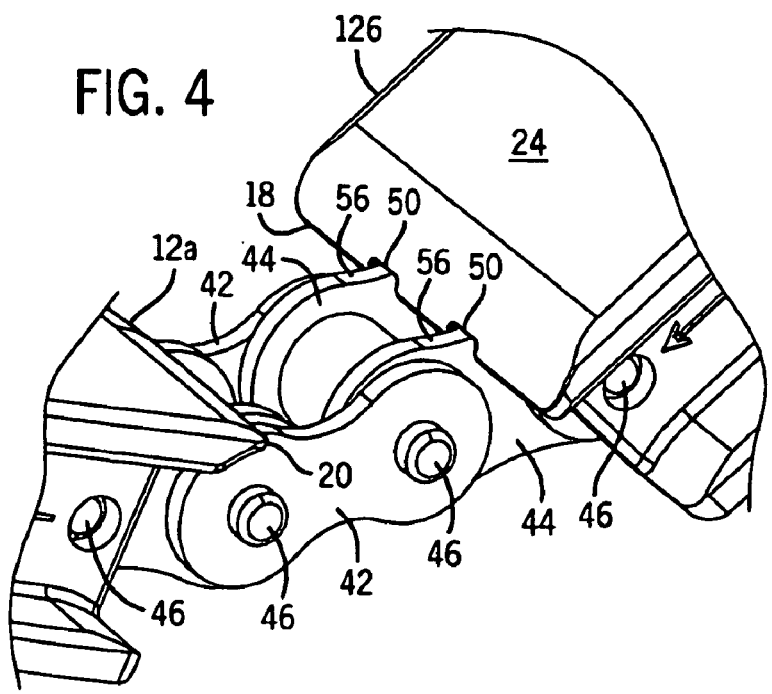
FIG. 4 is a downstream detailed perspective view of the conveying chain of FIG. 1 with an adjacent top plate removed.

As shown in FIGS. 2–4, the notches 50 formed in the leading edge 18 of the following top plate 12b receive the inner sidebars 44 preceding the top plate 12b. Receiving the preceding inner sidebars 44 in the notches allows the following top plate leading edge 18 to drop below the top edge 56 of the inner sidebars 44 during backflexing of the conveying chain 10. Advantageously, the notches 50 allow increased backflexing of the conveying chain 10 compared to a conveying chain having top plates without the notches. Although a pair of notches is disclosed for receiving the inner sidebars, the top plate can be fixed to the inner sidebars and the notches receive the outer sidebars without departing from the scope of the invention. Moreover, although a pair of notches is disclosed, a single notch formed in the leading edge can be provided for receiving the pair of sidebars without departing from the scope of the invention.

Figure 5:
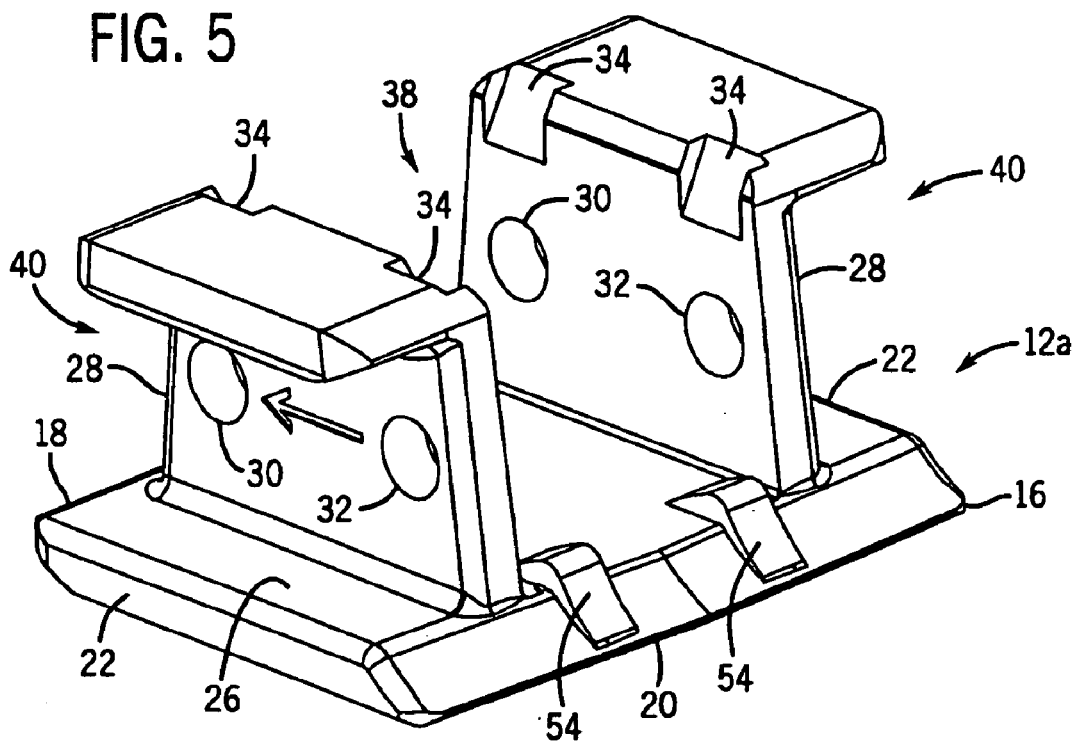
FIG. 5 is a bottom, rear perspective view of a top plate of FIG. 1.
Figure 6:
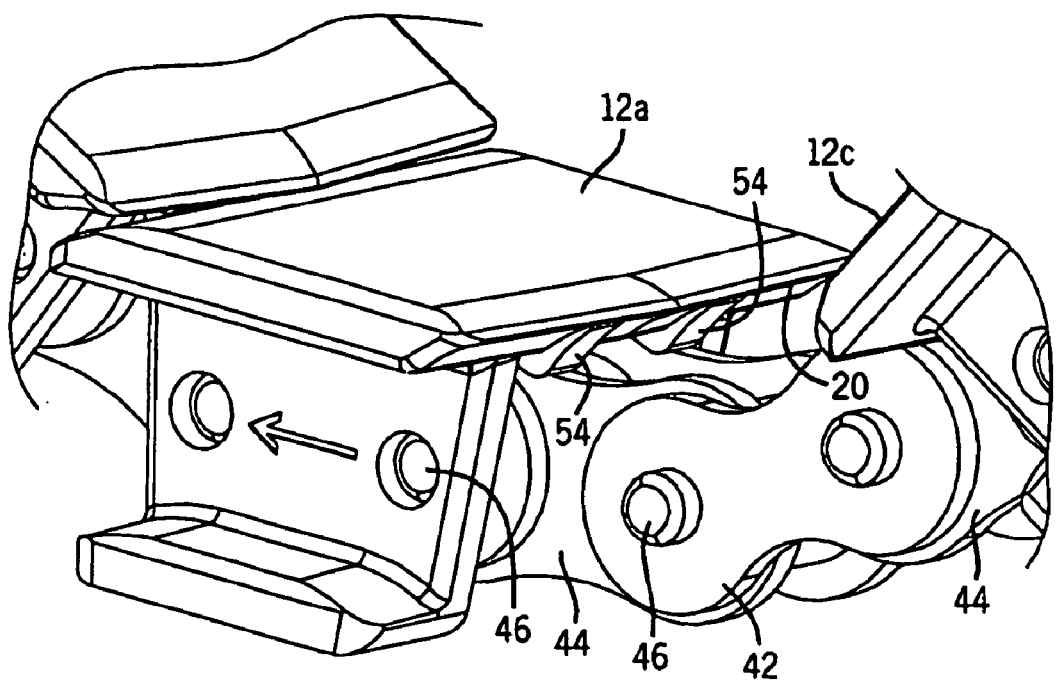
FIG. 6 is an upstream detailed perspective view of the conveying chain of FIG. 1 with an adjacent top plate removed.

As shown in FIGS. 2, 5, and 6, the bumps 54 are formed on the lower surface 26 proximal the trailing edge 20 of the preceding top plate 12a to engage the following pair of inner sidebars 44. Engaging the following inner sidebars 44 with the bumps 54 restricts articulation of the following inner sidebars 44 relative to the top plate 12a compared to an identical top plate without the bumps in order to minimize the potential for shingling. Although a pair of bumps is disclosed for engaging the following inner sidebars, the top plate can be fixed to the inner sidebars and the bumps engage the outer sidebars without departing from the scope of the invention. Moreover, although a pair of bumps is disclosed, a single bump can be provided for engaging one of the following sidebars without departing from the scope of the invention. Advantageously, the combination of the notches 50 and bumps 54 provide a conveying chain 10 that is not conducive to shingling without reducing the degree of backflexing that can be accomplished by the conveying chain 10.

As shown in FIGS. 3–6, a pair of legs 28 depends from the lower surface 26 of the base portion 16, each leg 28 having two eyes 30 and 32 such that the eyes 30 and 32 in one leg 28 are axially aligned with the eyes 30 and 32 in the other leg 28. On the lowermost portion of each leg 28, below and in aligned with each eye 30 and 32, is a ramp portion 34. A flange 36 extends outwardly from the lowermost portion of each leg 28. The legs 28 in conjunction with the lower surface 26 of the base portion 16 form an inner channel 38 for receiving the base chain 14. In addition, the legs 28 and flanges 36 in conjunction with the lower surface 26 of the base portion 16 form a pair of outer channels 40 for receiving a guide rail of a conveyor frame.

To secure the top plate 12 to the base chain 14, the base chain 14 is positioned in the inner channel 38 of the top plate 12. The top plate 12 is then aligned and pressed downwardly onto the chain 14 so that a chain pin 46 contacts the ramp portion 34 associated with each eye 30 and 32 on each leg 28. As the top plate 12 is pushed progressively downwardly, the chain pins 46 acting on the ramp portions 34, spreads legs 28 apart until the chain pins 46 reach the eyes 30 or 32 respectively at which point the legs 28 snap back into position, thus fixing the top plate 12 on the base chain 14.

Referring to FIGS. 1–6, in use, the base chain 14 is driven by a sprocket (not shown), as is known in the art, to move the conveying chain 10 and the product supported by the top plates 12a–h. As the conveying chain 10 wraps backward, such as shown in FIG. 1) around an idler roller or gear, the bumps 54 on the trailing edge 20 of the preceding top plate 12a engages the following inner sidebars 44 to restrict articulation of the following inner sidebars 44 relative to the preceding top plate 12a to ensure a space remains for the leading edge 18 of the following top plate 12b beneath the trailing edge 20 of the preceding top plate 12a. Meanwhile, the same inner sidebars 44 are received in the notches 50 formed in the leading edge 18 of the following top plate 12b to allow the leading edge 18 of the following top plate 12b to dip below the top edge 56 of the inner sidebars 44 to increase the degree of backflex capability.

While there has been shown and described what is at present considered the preferred embodiment of the invention, it will be obvious to those skilled in the art that various changes and modifications can be made therein without departing from the scope of the invention defined by the appended claims.

What is claimed is:

1. A product conveying chain comprising:
    a base chain formed from a series of pairs of inner sidebars pivotally connected to adjacent pairs of outer sidebars;
    a first top plate fixed to said base chain, and having a leading edge adjacent a preceding pair of one of said pair of inner sidebars and outer sidebars, said leading edge including at least one notch for receiving said preceding pair of one of said pair of inner sidebars and outer sidebars to allow increased backward flexure of the conveying chain compared to a conveying chain having top plate without said at least one notch.

2. The product conveying chain as in claim 1, in which said leading edge is tapered, and is overlapped by a trailing edge of a preceding second top plate.

3. The product conveying chain as in claim 1, in which said first top plate has a trailing edge adjacent a following pair of one of said pair of inner sidebars and outer sidebars, said trailing edge including at least one bump for engaging said following pair of one of said pair of inner sidebars and outer sidebars to restrict articulation of said following pair of one of said pair of inner sidebars and outer sidebars relative to said top plate compared to a top plate without said at least one bump.

4. The product conveying chain as in claim 3, in which said trailing edge is concave, and overlaps a leading edge of a following second top plate.

5. The product conveying chain as in claim 1, in which said first top plate is fixed to a pair of outer sidebars.

6. A product conveying chain comprising:
    a base chain formed from a series of pairs of inner sidebars pivotally connected to adjacent pairs of outer sidebars;
    a first top plate fixed to said base chain, and having a leading edge and a trailing edge, said leading edge being adjacent a preceding pair of one of said pair of inner sidebars and outer sidebars, said leading edge including at least one notch for receiving said preceding pair of one of said pair of inner sidebars and outer sidebars to allow increased backward flexure of said conveying chain compared to a conveying chain having a top plate without said at least one notch, and said trailing edge being adjacent a following pair of one of said pair of inner sidebars and outer sidebars, said trailing edge including at least one bump for engaging said following pair of one of said pair of inner sidebars and outer sidebars to restrict articulation of said following pair of one of said pair of inner sidebars and outer sidebars relative to said top plate compared to a top plate without said at least one bump.

7. The product conveying chain as in claim 6, in which said leading edge is tapered, and is overlapped by a trailing edge of a preceding second top plate.

8. The product conveying chain as in claim 6, in which said trailing edge is concave, and overlaps a leading edge of a following second top plate.

9. The product conveying chain as in claim 6, in which said first top plate is fixed to a pair of outer sidebars.

* * * * *